Oct. 1, 1968     C. W. NUISSL     3,403,501
YARN-TREATMENT, METHOD AND APPARATUS
Filed July 15, 1966     3 Sheets-Sheet 1
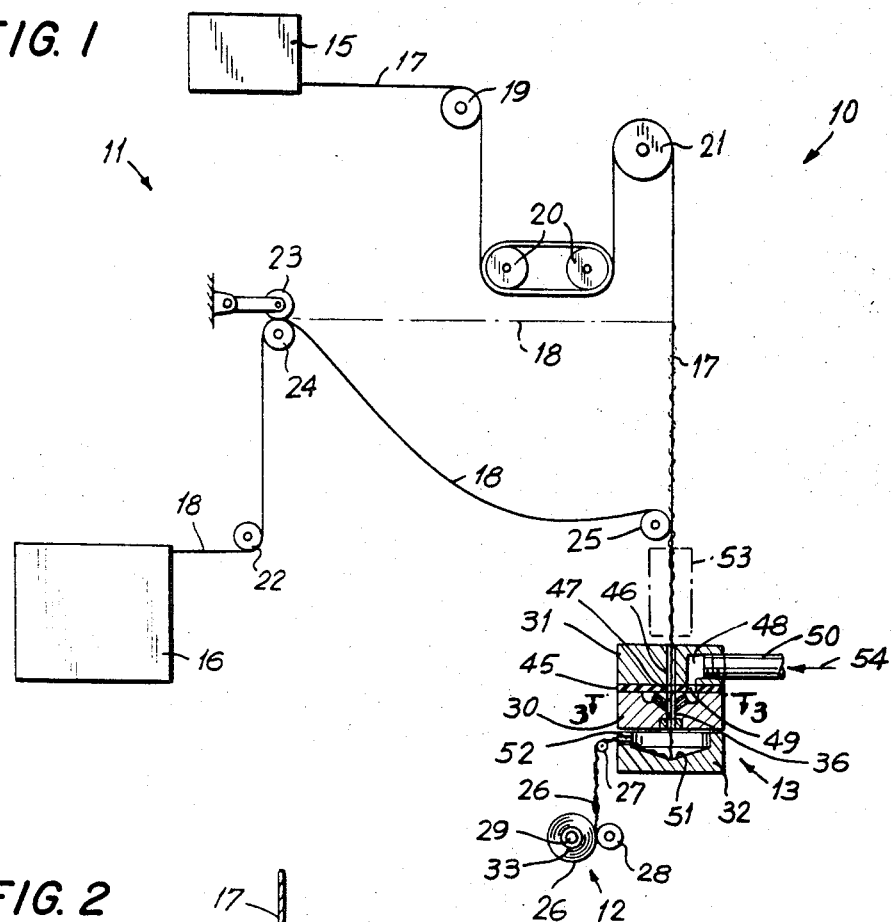
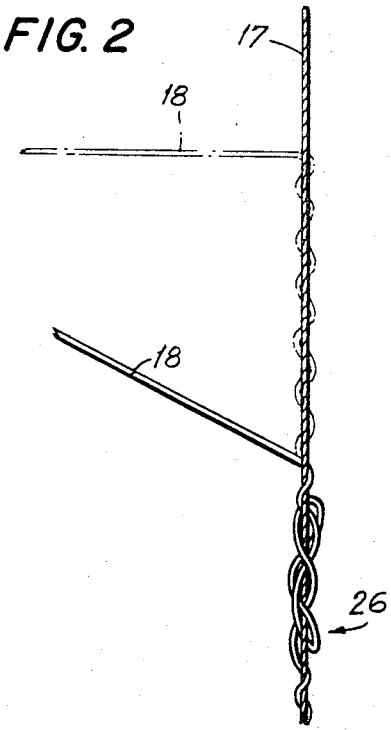
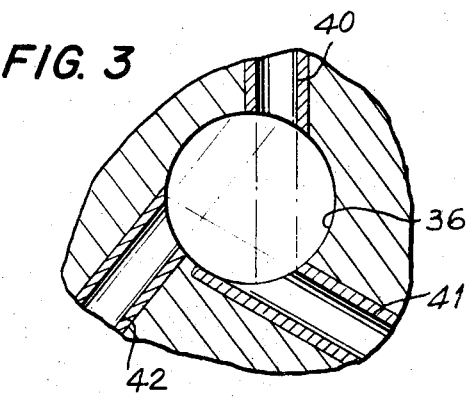
INVENTOR.
CARL W. NUISSL
BY
ATTORNEY Oct. 1, 1968 C. W. NUISSL 3,403,501

YARN-TREATMENT, METHOD AND APPARATUS

Filed July 15, 1966 3 Sheets-Sheet 2

INVENTOR.
CARL W. NUISSL

BY *Susan L. Lilling*

ATTORNEY

Oct. 1, 1968  C. W. NUISSL  3,403,501
YARN-TREATMENT, METHOD AND APPARATUS
Filed July 15, 1966  3 Sheets-Sheet 3
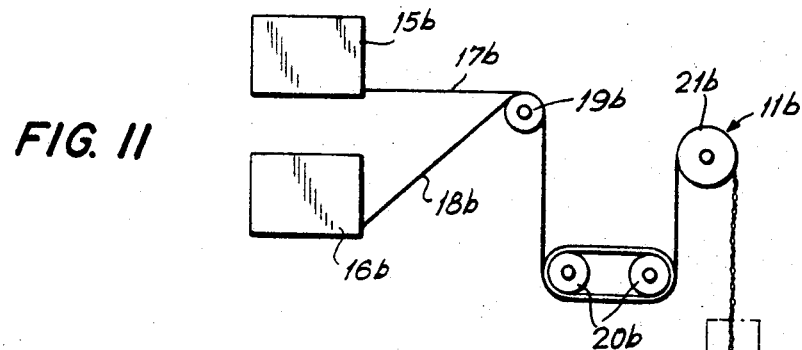
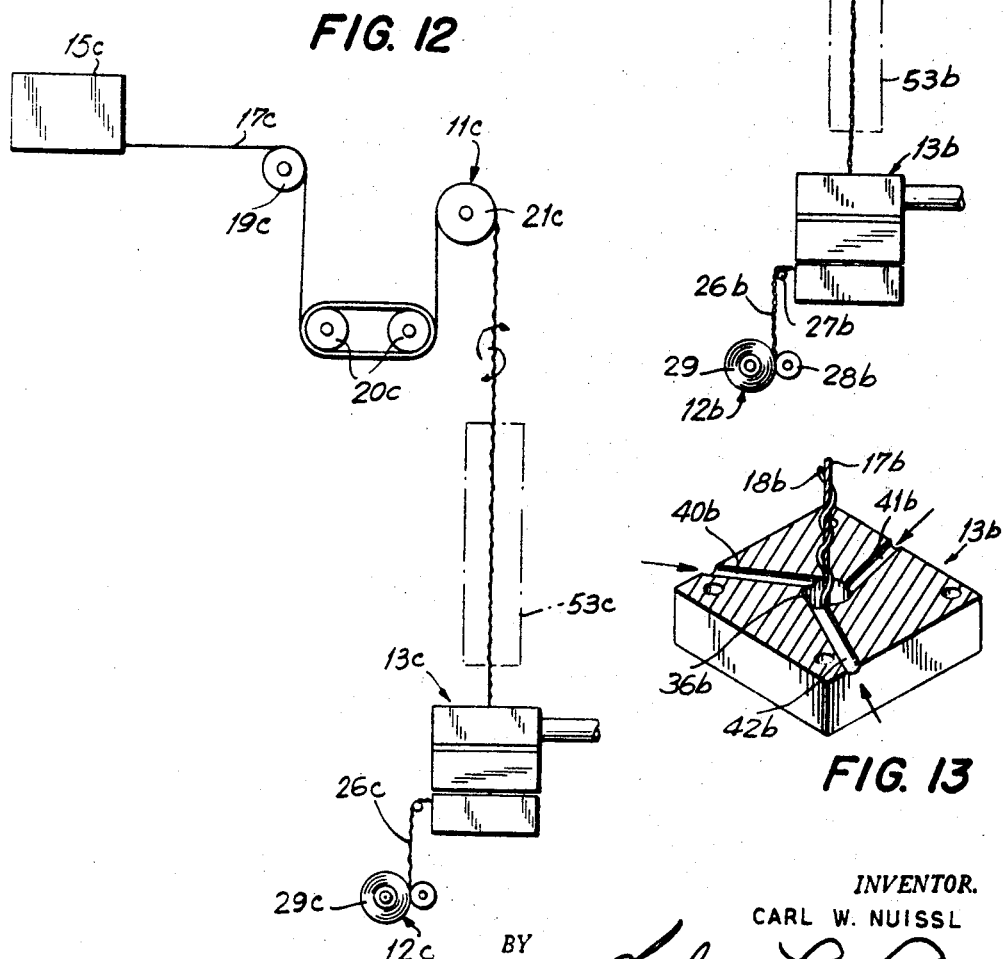
INVENTOR.
CARL W. NUISSL
BY
ATTORNEY

United States Patent Office 3,403,501
Patented Oct. 1, 1968

3,403,501
YARN-TREATMENT, METHOD AND APPARATUS
Carl W. Nuissl, Sheldonville, Mass., assignor to Nuval
Co., Cumberland, R.I., a corporation of Rhode Island
Filed July 15, 1966, Ser. No. 565,574
32 Claims. (Cl. 57—77.3)

ABSTRACT OF THE DISCLOSURE

This invention is concerned essentially with a method and apparatus for the treatment of yarn, wherein the yarn to be treated is fed into a passageway in which a vortical motion is created by a fluid directed generally nonradially therein.

---

The instant application is concerned not only with producing novelty yarns, but also embraces improved methods and apparatus for twisting a single multifilament yarn or a plurality of yarns.

Accordingly, it is an important object of the present invention to provide a unique apparatus and highly advantageous method which are extremely versatile, being capable of producing a wide variety of novelty yarn, as well as various types of twisted yarn.

It is another object of the present invention to provide apparatus of the type described which is extremely simple, obviating the need for the complex and expensive equipment heretofore considered essential, and which effects substantial savings in capital expenditure, as well as installation, maintenance and overhead costs.

It is another object of the present invention to provide a uniquely advantageous method of treating yarn, which is capable of many varied applications, and which effects greatly increased production rates over prior methods, thus achieving considerable savings in production cost.

It is a more particular object of the present invention to provide a unique method and apparatus whereby a variety of novelty yarns may be produced having core and effect yarns, such as slubbed and nubbed yarns, and which are further admirably well suited for effecting various desired twists in single and multifilament yarn, including Z and S twists, as desired.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description and of which the scope will be indicated by the appended claims.

In the drawings:

FIGURE 1 is a diagrammatic representation of apparatus of the present invention, illustrating the practice of the instant method, as employed in producing novelty yarn;

FIGURE 2 is a greatly enlarged partial view showing the operation of the method illustrated in FIGURE 1 to produce novelty yarn;

FIGURE 3 is a diagrammatic view greatly enlarged, taken generally along the line 3—3 of FIGURE 1, to show the intersection of the fluid pasageways with the central opening, in one embodiment of this invention;

FIGURE 11 is a diagrammatic representation illustrating a further emodiment of apparatus of the present invention as employed in a method of the invention for twisting a plurality of yarns;

FIGURE 12 is another diagrammatic representation of apparatus of the present invention illustrating the method hereof as utilized in twisting of a single multi-filament yarn; and FIGURE 13 is an enlarged perspective view, in section, illustrating detailed structure of another emodiment of a portion of the instant apparatus.

Figure 4:
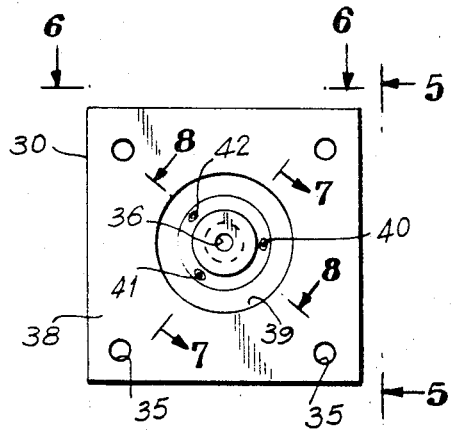
FIGURE 4 is a plan view illustrating a component part of the apparatue of FIGURE 1 in greater detail.
Figure 5:
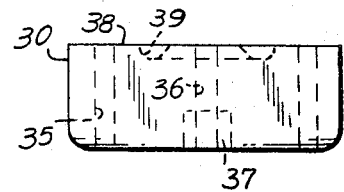
FIGURE 5 is a side view taken generally along the line 5—5 of FIGURE 4.
Figure 6:
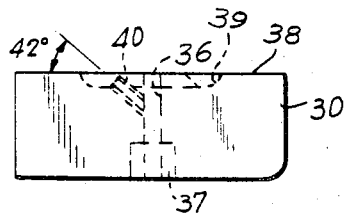
FIGURE 6 is a side view taken generally along the line 6—6 of FIGURE 4.
Figure 7:
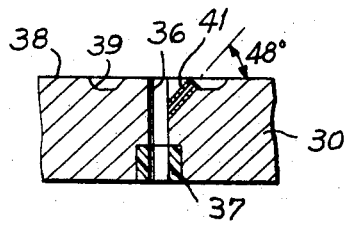
FIGURE 7 is a partial sectoinal view taken generally along the line 7—7 of FIGURE 4.
Figure 8:
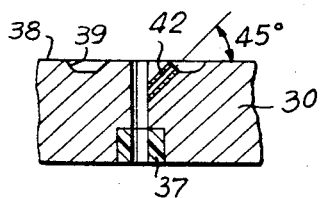
FIGURE 8 is a partial sectional view taken generally along the line 8—8 of FIGURE 4.

Referring now more particularly to the drawings, and particularly to FIGURE 1 thereof, there is illustrated therein yarn-treating apparatus generally designated 10, including yarn-feeding means 11, yarn-take-up means 12, and a yarn-twisting head 13.

In the embodiment of FIGURE 1 the yarn-feeding means 11 includes a pair of yarn supplies 15 and 16, respectively supplying yarns 17 and 18. The yarns 17 and 18 may be of single or multifilament, as desired. Yarn 17 may be considered as a core yarn in the modification of FIGURE 1, passing over a guide roll 19 and thence about a pair of tension-control rolls 20 for effective frictional engagement therewith to maintain a predetermined tension of the yarn 17. That is, at least one of the rolls 20 may be spring biased or otherwise arranged for adjustable tension control. From the rolls 20, the yarn 17 passes over an idler roil 21, and may thence proceed downward toward the twister head 13.

The yarn supply 16 of the yarn-feed means 11 includes an idler roll 22, the yarn 18 passing upward therefrom between the nip of the rollers 23 and 24. The roller 23 may be an idler roller in driving relation with the roller 24 which may be driven by any suitable means and the yarn 18 may thereby be fed at a predetermined rate for insuring a desired linear speed of the yarn. From the rollers 23 and 24, the yarn 18 passes generally transversely and is then guided downward over the guide roller 25 toward the yarn 17 and combines with the latter to provide an effect yarn therefor.

The combined yarns 17 and 18 emerge from the twister head 13 as a novelty yarn 26, passing over an idler roller 27, to the take-up or withdrawal means 12. The withdrawal means may include a driven take-up roll 28, driven by any suitable means, and a cooperating idler roll 29, holding a standard packaging core 33, frictionally engaging the roll 28 and defining a nip therebetween which engages or pinches the novelty yarn 26, the yarn then being wound about the core 33 by frictional engagement with the driven roller 28. Thus, the take-up roll 29 may be powered for winding or coiling of the treated yarns onto a standard packaging core, at a speed consistent with the desired yarn treatment, thus permitting winding of the treated yarn directly onto a core suitable for shipping and thereby precluding the necessity, as required by the use of existing apparatus, of having to take up the yarn onto bobbins and thereafter respooling same onto the standard packaging cores.

The twister head 13 includes an intermediate block or member 30, an upper member 31 secured on the top thereof and a lower member 32 secured for movably fixed positioning relative the underside of member 30.

The intermediate member 30 is best seen in FIGURES 4–8 as including a generally solid body or block which may be of generally rectangular-outline configuration having at its corner regions thru holes 35 for receiving fasteners secured to the upper member 31. Centrally of the intermediate member 30 is a thru bore or hole 36 extending vertically, as illustrated in FIGURE 1, and being provided in its lower portion with an annular wear member or bushing 37, say of ceramic or other relatively non-abrasive material. The bushing 37 has its central opening aligned with the bore 36, so that the bore opens upwardly and downwardly through the upper and lower surfaces of the intermediate member 30.

The upper surface 38 of the intermediate member 30 may be formed with an annular groove or recess 39 spaced concentrically about the bore 36. The annular recess 39 opens upwardly and is provided at angularly spaced locations thereabout with a plurality of generally radially inwardly and obliquely downwardly extending open-ended tubes 40, 41 and 42. The tubes 40, 41 and 42 thus each communicate between the recess 39 and the interior of bore 36. Advantageously, the tubes 40, 41 and 42 may be at different angles of declination, being shown for purposes of illustration and without limiting intent as at 42 degrees, 48 degrees and 45 degrees, respectively. Further, the tubes 40, 41 and 42 may open into or intersect with the central bore 36 at different angular relations, as seen in FIGURE 3, the tube 40 extending almost, but not quite radially, while the tube 41 extends substantially tangentially, and the tube 42 extends chordally at an angle between that of the tubes 40 and 41. As will appear more fully hereinafter, more or less tubes 40 and 41 and 42 may be employed, as desired.

The upper member 31 is superposed over the intermediate member 30, and a gasket or resilient sheet 45 having a central hole 47 is interposed between the upper and intermediate members. Centrally of the upper member is a thru bore 46 in alignment with the thru hole 47 in the gasket 45, which together are aligned with the bore 36 of the intermediate member 30 and combine therewith to define an upwardly opening inlet passageway for the yarns 17 and 18.

The annular recess 39 is closed by the gasket 45, and the upper member 31 is provided with a passageway 48 communicating through a hole 49 in the gasket 45 with the recess 39. A fluid-supply conduit or pipe 50 may be connected to the upper member 31 for communication through the passageway 48 and hole 49 into the recess or chamber 39.

The lower member 32 is secured in facing relationship with the underside of the intermediate member 30 and may be provided in its upper surface with an upwardly facing, generally circular dished recess 51. The lower member 32 will serve as a baffle for the fluid emitting through the bushing 37 and the central bore 36, and the recess 51 as a chamber to accumulate and re-direct the yarn 26. However, it has been found that the lower member 32 is not necessary to the function of the apparatus or the employment of the method hereof and may therefore be dispensed. It has been found to be useful sometimes, for obtaining different effects in "core and effect" yarn.

A generally radial bore 52 extends from the interior of recess 51 exteriorly of the lower member 32 and combines with the recess 51 to define an outlet passageway for the treated yarn 26.

An open-ended tubular heater, or other suitable heater, may be provided at 53 above or ahead of the inlet passageway 46, 47, 36 through which the yarns 17 and 18 may pass and be treated by heat, if desired.

In practice of the instant invention, air under pressure is fed through conduit 50, see FIGURE 1, in the direction of arrow 54 and passes through passageway 48 and hole 49 into annular chamber 39. It then enters into and passes through tubes 40, 41 and 42 into bore 36. It will be appreciated that a vortical motion of air is produced in bore 36, which vortical motion occupies substantially the entire cross section of the bore, as air enters through tube 40 almost radially, through the tube 41 tangentially and through tube 42 chordally. While the invention has been practiced with only tangential entry of air into bore 36, and satisfactory results have been achieved, superior results are achieved when air enters other than tangentially, as through tubes 40 and 42.

It is an established fact that a jet of gas will tend to follow the wall contour when discharged adjacent to a surface even when that surface curves away from the jet discharge axis. This is known as Coanda effect. Such effect may be of no consequence where the central bore is of a relatively small diameter. However, in order to assure that there be no detrimental consequences because of any Coanda effect that may result with only the tangential entry of air, it is preferable, where a plurality of air entry passageways are provided, that at least one entry be other than tangential. Of course, the Coanda effect may be minimized, and this invention may be practiced with only the tangential entry of air, if the diameter of the central bore be relatively small, as aforesaid, or, if other means to reduce Coanda effect are provided such as the spiral internal groove 55 of the embodiment shown in FIGURES 9 and 10.

The core yarn 17 is fed under uniform tension and at a predetermined rate downward from idler roll 21 toward the twister head 13, and the effect yarn 18 is overfed or fed at a greater rate of speed, laterally or transversely, toward the core yarn, and thence together with the core yarn into the twister head 13. As the yarns 17 and 18 pass through the yarn-inlet passageway 46, 47, 36, and through the vortical fluid motion therein, twisting is achieved, which twisting proceeds backward or upward along the yarn. Due to the greater velocity and resultant overfeed of effect yarn 18 relative to that of core yarn 17, the effect yarn combines with the core yarn in a twisting action about the latter and the juncture of effect yarn 18 with core yarn 17 rides up and down the latter to produce a varying novelty effect.

It will be appreciated that the idler roll 21 is effective additionally as snubbing means and will, therefore, act to restrict the length of the effected area. That is, where the novelty effect desired is a slubbed yarn, the length of the slub to be formed may be limited by the distance of the idler roll 21 from the inlet passageway, as well as by the other means described.

The yarns 17 and 18 thus combine to produce a novelty yarn 26 which is drawn downwardly by the declination of tubes 40, 41 and 42 directing the vortical fluid motion downwardly, to contribute toward maintaining the core yarn 17 under tension during twisting thereof. From the chamber 51, the novelty yarn 26 is withdrawn through outlet bore 52 and wound about rotating roll 29. If desired, the heater 53 may be employed to set the twist imparted to the yarn, as with heat-settable yarn.

Figure 9:
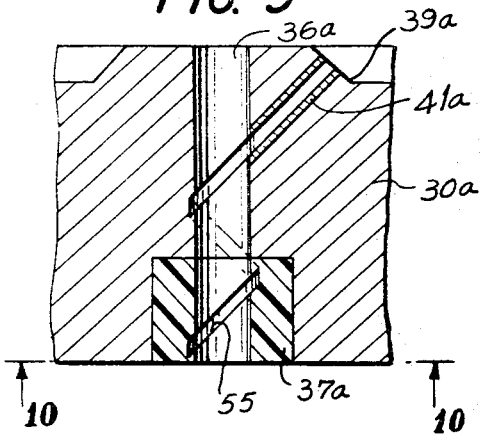
FIGURE 9 is a partial sectional view similar to FIGURES 7 and 8, but illustrating a slightly modified embodiment of the present invention.
Figure 10:
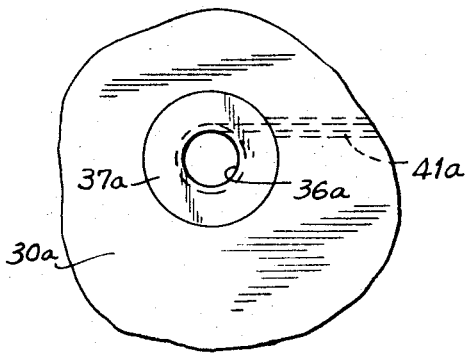
FIGURE 10 is a bottom plan view taken generally along the line 10—10 of FIGURE 9.

While the twister head 13 is illustrated as having a vortical fluid motion produced by three fluid passageways 40, 41 and 42, it is appreciated that a greater or lesser number of passageways may be employed to produce vortical fluid motions of various types. For example, in FIGURES 9 and 10 is shown a slightly modified embodiment of intermediate member 30a having a central thru bore 36a and an upper annular recess 39a spaced concentrically about the thru bore. A single open-ended air-conducting tube 41a may extend obliquely downward from the recess 39a into generally tangential relation with and opening into the bore 36a. Further, the interior of the bore 36a may be provided with a spiral internal groove 55 extending spirally downwardly from the lower end of the tube 41a. By this construction, fluid entering from the tube 41a into bore 36a effectively defines a vortical motion for achieving a yarn-twisting effect.

In the embodiment shown in FIGURE 11 a yarn-feeding means 11b feeds yarn to a twister head 13b, while a yarn-take-up or withdrawal means 12b winds or coils treated yarn discharged from the twister head.

The yarn-feeding means may include a pair of yarn supplies 15b and 16b respectively supplying yarns 17b and 18b which pass together over an idler roll 19b and thence about drive rolls 20b. The yarns 17b and 18b pass from the drive rolls 20b over an idler roll 21b and thence downward into the yarn-inlet passageway of twister head 13b. In this embodiment, the yarns 17b and 18b are fed at equal velocities but at a rate greater than the rate of take-up thus to facilitate their being twisted together, in either direction as desired, by twister head 13b without the novelty effect of the first-described embodiment. The combined, twisted yarns 26b discharged from the twister head 13b may pass over an idler roll 27b, and thence between rotary rolls 28b and 29b to be wound about the latter.

Of course, the yarns 17b and 18b may each be of single or multifilament, as desired, and may be twisted together in the manner illustrated by any of the embodiments of the twisting head herein disclosed.

Of course, suitable twist-setting means may be employed in the embodiment of FIGURE 11, such as a cylindrical heater 53b in heating relation with the twisted yarns 17b and 18b ahead of the twister head 13b. That is, as twisting by the instant method moves backward along the yarns from the twister head, the twist may be set ahead of the twister head.

Of course, it will again be appreciated that the idler roll 21b, as in the previous embodiment, is effective as snubbing means, and, therefore, the length of the resulting sectional twist may be affected by the distance of the idler roll 21b from the yarn inlet passageway.

In the embodiment shown in FIGURE 12, a yarn-feeding means is generally designated 11c and feeds yarn to a twister head 13c, from which yarn is withdrawn by yarn-take-up means 12c.

The yarn-feeding means 11c may include a single yarn supply 15c supplying a single multi-filament yarn 17c which may pass over an idler roll 19c and thence about drive rolls 20c for passage over an additional idler roll 21c. From the latter idler roll the yarn 17c passes downward into the twister head 13c and therein through a vortical fluid action for achieving the desired twisting effect. Here again, suitable twist-setting means may be employed, such as a heater 53c ahead of the twister head 13c for setting the twist in the yarn 17c. The twisted yarn 26c is withdrawn from the twister head 13c and coiled about a take-up roll 29c.

It will be apparent that the embodiments described in connection with FIGURES 11 and 12 are a simple twisting method and apparatus, without production of novelty effects. However, the yarn twisting by this method and apparatus is at a much greater rate of speed than possible with conventional methods, and greater versatility of twist is adapted to be accomplished with a minimum of equipment and effort, as by varying feeding and withdrawal speeds, and varying the characteristics of the vortical fluid action.

The heretofore described vortical effect may be achieved, as aforesaid, by a greater or lesser number of passageways extending obliquely downward from the recess 39 or 39a at equal and/or different and at various angles of declination. Such passageway or passageways may, in another alternate embodiment of this invention, extend horizontally or perpendicular to the central opening 36 or 36a and may intersect with the central opening at like or different and various angular relations. A single passageway may intersect not quite radially, substantially tangentially or chordally. A plurality of passageways may all intersect either not quite radially, substantially tangentially or chordally; or each may intersect at a different angular relation ranging from not quite radially to tangentially.

Referring to FIGURE 13, the several fluid passageways 40b, 41b and 42b are there shown extending horizontally or perpendicular to a central opening 36b and intersecting and opening non-radially into the central opening of a twister head 13b. Yarns 17b and 18b are twisted together, in the manner there illustrated, by the twisting effect of the vortical motion in the twister head 13b, achieved by the fluid medium entering through the passageways 40b, 41b and 42b.

In the embodiment shown in FIGURE 13, the several fluid passageways 40b, 41b and 42b may all be entirely separate and provided with independent sources of fluid under different pressures, if desired. In this manner, a variety of twisting effects may be achieved.

From the foregoing, it is seen that the present invention provides a method and apparatus for treating yarn, which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Yarn-treatment apparatus comprising yarn-feeding means, yarn-take-up means, and a twister head having a yarn-inlet passageway extending into said head for receiving yarn from said feeding means, said twister head having a yarn-outlet passageway extending exteriorly of said head transversely from the inner end of said inlet passageway for discharging yarn to said take-up means, and said head being provided with at least one fluid passageway having its inner end intersecting non-radially with said yarn-inlet passageway, the outer end of said fluid passageway being adapted for connection to a source of fluid under pressure, whereby yarn passing between said feeding and take-up means through said inlet and outlet passageways has a twist imparted by fluid passing from said fluid passageway.

2. Yarn treating apparatus according to claim 1, said twister head being provided with a plurality of fluid passageways each of said fluid passageways having its inner end intersecting nonradially with said yarn inlet passageway.

3. Yarn-treating apparatus according to claim 2, at least one of said fluid passageways extending nontangentially with respect to said yarn-inlet passageway to reduce the Coanda effect.

4. Yarn-treating apparatus according to claim 1, said one fluid passageway extending obliquely toward the inner end of said yarn-inlet passageway for imparting tension to said yarn while twisting.

5. Yarn-treating apparatus according to claim 2, at least one of said fluid passageways extending obliquely toward the inner end of said yarn inlet passageway for imparting tension to said yarn while twisting.

6. Yarn-treating apparatus according to claim 1, in combination with twist-setting means interposed between said twister head and yarn-feeding means, the twist imparted to said yarn traveling back toward said feeding means to be set by said setting means.

7. Yarn-treating apparatus according to claim 1, said yarn-feeding means comprising roll means for feeding a single yarn of a selected number of ends at a predetermined speed.

8. Yarn-treating apparatus according to claim 7, said yarn-feeding means comprising second roll means for feeding a second single yarn of a selected number of ends at a predetermined speed transversely toward said first-mentioned single yarn for twisting about the latter.

9. Yarn-treating apparatus according to claim 1, said take-up means comprising a rotatable roll for coiling thereabout yarn from said outlet passageway.

10. Yarn-treating apparatus according to claim 1, said outlet passageway being defined by an enlarged chamber communicating with the inner end of said inlet passageway, and a generally radial outlet port extending from said chamber exteriorly of said head.

11. In the method of preparing compact novelty yarn, the steps which comprise: directing fluid generally non-radially into an elongated passageway to create vortical motion, feeding a yarn to be treated longitudinally into said passageway for movement through said vortical fluid motion to be twisted thereby, and withdrawing said yarn transversely of said passageway.

12. The method according to claim 11, further characterized in directing said fluid generally in the direction of yarn movement to tension the yarn while twisting.

13. The method according to claim 11, further characterized in withdrawing said yarn by coiling on a rotating roll.

14. The method according to claim 11, further characterized in feeding a plurality of yarns longitudinally into said passageway for movement through said vortical fluid motion to be twisted together.

15. The method according to claim 14, further characterized in feeding said plurality of yarns at substantially the same speed.

16. The method according to claim 14, further characterized in feeding one of said yarns at a greater speed than the other, for producing novel effects by said one yarn.

17. The method according to claim 11, further characterized in setting the twist in said yarn.

18. The method according to claim 17, wherein said setting is performed ahead of said vortical fluid motion.

19. A twister head comprising: a body portion, a bore extending vertically through said body portion to receive yarn to be treated, a plurality of fluid inlet passageways having their inner ends communicating to the interior of said bore, said fluid inlet passageways being at angularly spaced locations relative said bore and extending generally radially inwardly at different angular relations to the point of intersection with said bore, the outer end of said fluid inlet passageways being adapted for connection to a source of fluid under pressure, whereby said fluid is directed into said bore at different angles thereby reducing the Coanda effect.

20. A twister head according to claim 19, wherein said fluid inlet passageways extend also obliquely downwardly to the point of intersection with said bore.

21. A twister head according to claim 20, wherein said fluid inlet passageways each extend obliquely downwardly at different angles of declination.

22. A twister head according to claim 19, having at least three of said fluid inlet passageways, one of said passageways intersecting said bore not quite radially, the second of said passageways intersecting said bore substantially tangentially and the third of said passageways intersecting said bore chordally at an angle between the angles of intersection of said first and second passageways thus to reduce Coanda effect.

23. A twister head according to claim 22, wherein said fluid inlet passageways extend also obliquely downwardly at different angles of declination to the point of intersection with said bore, for imparting tension to the yarn being treated.

24. A twister head according to claim 23, further including an annular recess intermediate the upper and lower surfaces of said body, said recess being generally concentrically spaced about said bore and in fluid communication with the outer ends of each of said fluid passageways for distributing fluid under pressure into each of said fluid passageways, and, further including means for connecting said annular recess to a source of fluid under pressure.

25. A twister head according to claim 20, further including baffle means adjacent the outlet end of said bore thus to take the treated yarn out of the air stream in said bore.

26. A twister head according to claim 25, wherein said baffle means comprises an enlarged chamber communicating with the outlet end of said bore, and a generally radial outlet port extending from said chamber exteriorly thereof thus to withdraw the treated yarn transversely of said bore and out of the air stream therein.

27. A twister head according to claim 19, in combination with means for snubbing at least one of the yarns to be treated, said snubbing means being positioned before the inlet of said bore in line with the extension of the axis of said bore at a distance from said inlet of at least the length of the slub to be formed.

28. A twister head according to claim 19, in combination with means for snubbing the yarn to be twisted, said snubbing means being positioned before the inlet of said bore in line with the extension of the axis of said bore at a distance from said inlet of at least the length of the sectional twist direction desired.

29. A twister head comprising: a body portion, a bore extending vertically through said body portion to receive yarn to be treated, at least one fluid passageway having its inner end communicating to the interior of said bore, said fluid passageway extending generally radially inwardly and obliquely downwardly to a point of intersection with said bore, the interior of said bore having a spiral internal groove extending spirally downwardly from the point of intersection with said fluid passageway, the outer end of said fluid passageway being adapted for connection to a source of fluid under pressure, thus imparting a vortical motion to the fluid entering the said bore, reducing the Coanda effect and imparting tension to the yarn being treated.

30. The method according to claim 11, further characterized in snubbing the yarn to be treated at a point distant from the inlet to said elongate passageway equal at least to the length of sectional twist direction desired.

31. The method according to claim 14, further characterized in snubbing the yarns to be treated at a point distant from the inlet to said elongate passageway equal at least to the length of sectional twist direction desired.

32. The method according to claim 14, further characterized in snubbing at least one of the yarns to be treated at a point distant from the inlet to said elongate passageway equal at least to the length of a slub to be formed.

References Cited

UNITED STATES PATENTS

| | | | |
|---|---|---|---|
| 2,584,043 | 1/1952 | Oberly | 28—72 |
| 2,990,671 | 7/1961 | Bunting et al. | 57—77.3 XR |
| 3,005,251 | 10/1961 | Hallden et al. | 28—1 |
| 3,079,745 | 3/1963 | Breen et al. | 57—34 |
| 3,082,591 | 3/1963 | Marshall | 57—6 |
| 3,206,922 | 9/1965 | Nagahara et al. | |
| 3,302,386 | 2/1967 | Gonsalves et al. | 57—34 XR |
| 3,332,125 | 7/1967 | Davis et al. | 57—34 XR |
| 3,340,684 | 9/1967 | Schichman | 57—77.3 XR |

STANLEY N. GILREATH, *Primary Examiner.*

DONALD E. WATKINS, *Assistant Examiner.*